Sept. 8, 1959 A. G. LOOFBOURROW 2,902,881
VEHICLE TRANSMISSION CONTROL APPARATUS
Filed Jan. 17, 1956 2 Sheets-Sheet 1
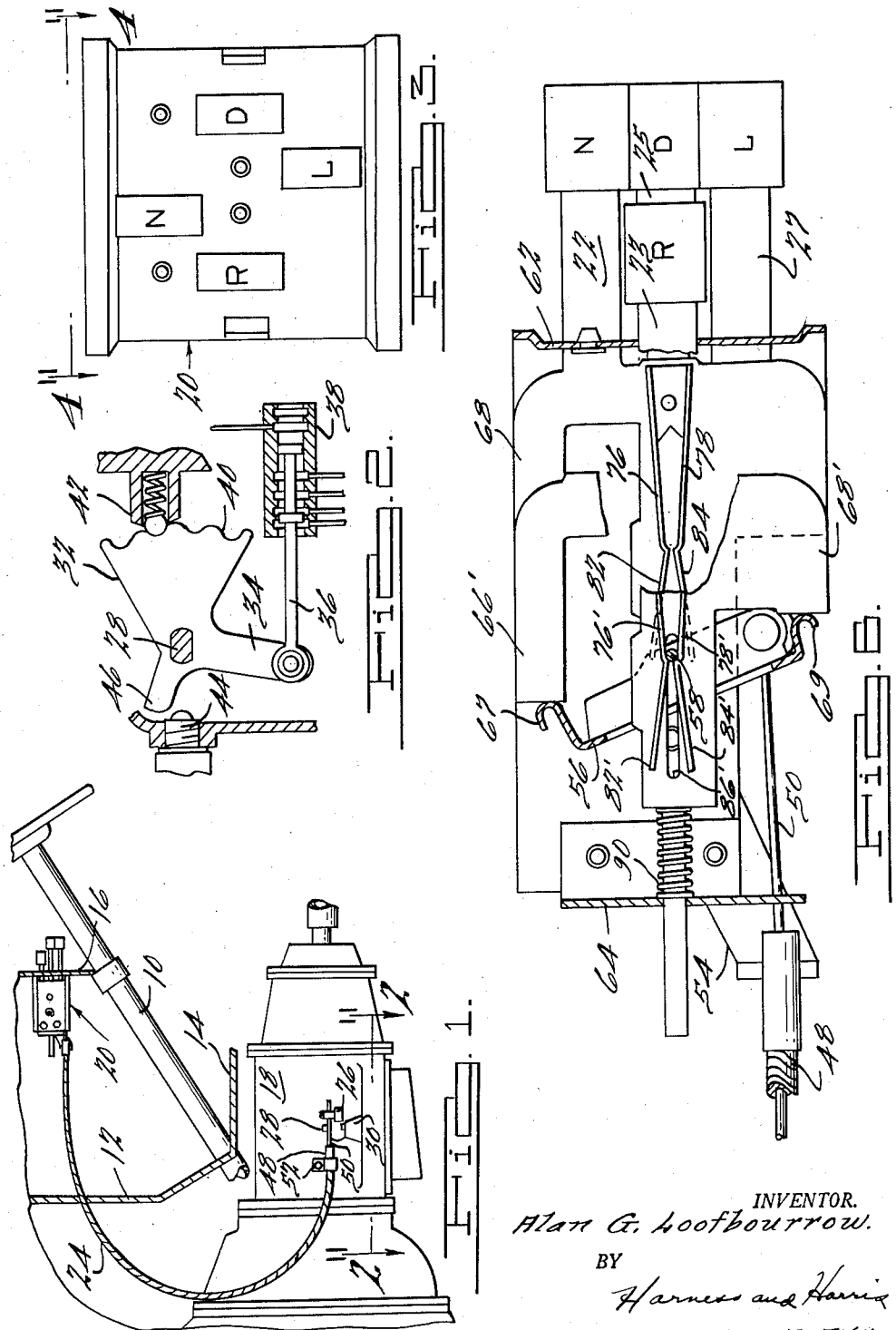
INVENTOR.
Alan G. Loofbourrow.
BY
Harness and Harris
ATTORNEYS.

Sept. 8, 1959  A. G. LOOFBOURROW  2,902,881
VEHICLE TRANSMISSION CONTROL APPARATUS
Filed Jan. 17, 1956  2 Sheets-Sheet 2
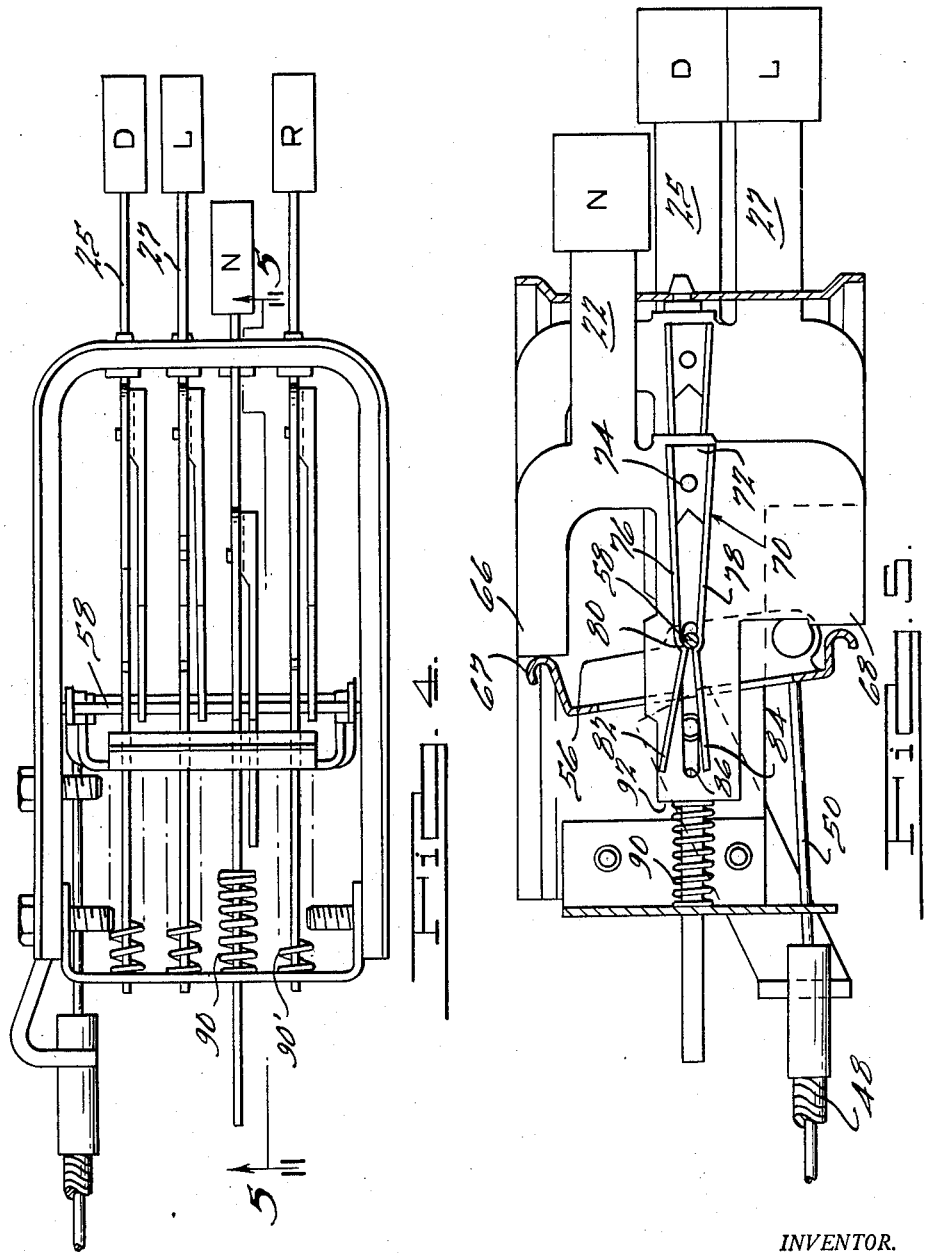
INVENTOR.
Alan G. Loofbourrow.
BY
Harness and Harris
ATTORNEYS.

United States Patent Office 2,902,881
Patented Sept. 8, 1959

2,902,881

VEHICLE TRANSMISSION CONTROL APPARATUS

Alan G. Loofbourrow, Bloomfield Hills, Mich., assignor to Chrysler Corporation, Highland Park, Mich., a corporation of Delaware Application January 17, 1956, Serial No. 559,597

15 Claims. (Cl. 74—473)

The present invention relates to transmission control apparatus and has particular reference to apparatus of the push button type to effect selective operation of a motor vehicle transmission.

The apparatus to be described herein is adapted for use in combination with a transmission control apparatus of the type illustrated and described in Jeremy T. Ball patent application, Serial No. 477,870 filed December 27, 1954, and is an improvement of the type of device shown and described in my copending application, Serial No. 530,528 filed August 25, 1955. The transmission described in the above mentioned Ball application is representative of some current commercial transmissions to the extent that a hydraulic control system for the transmission is regulated by movement of a single valve.

In the past, a certain amount of difficulty has been encountered in the operation of push button controls for vehicle transmissions in that the movement of a push button lever to its operating position releases the previously applied lever during the early part of its stroke. As a result, if the operator of the vehicle is not watching the push buttons when he pushes one, he may believe that the lever has been applied when in reality the noise which he heard was merely the previously applied lever being released. Under these conditions, the operator does not continue the pushing movement of the lever and no transmission shift has been effected. Accidents are possible therefore particularly where the desired shift is from a reverse to a forward speed or vice versa.

A principal object of this invention, therefore, is to provide an improved push button control mechanism for vehicle transmissions which includes push button lever operation where one lever is positively applied while substantially simultaneously releasing a previously applied lever.

Other objects and advantages of the invention will become more apparent from the following description of one embodiment of my invention, reference being had to the accompanying drawings in which:

Fig. 1 is a fragmentary side elevation of a portion of a motor vehicle incorporating the transmission control apparatus to be described herein.

Fig. 2 is a fragmentary horizontal sectional view taken on the line 2—2 of Fig. 1.

Fig. 3 is a front elevational view of the control box.

Fig. 4 is a plan view of the control box as viewed in the direction of the arrows 4—4 in Fig. 3.

Fig. 5 is a sectional view taken on the lines 5—5 in Fig. 4.

Fig. 6 is a sectional view similar to Fig. 5 showing the mechanism in a different push button position and having a portion broken away to more clearly show the spring means.

In Fig. 1 a portion of a motor vehicle is illustrated as including a steering column 10, a fire wall 12, a floor pan 14, an instrument panel 16 and a transmission 18. A control box 20 is supported on the instrument panel 16 and is illustrated as provided with a plurality of selectively operable elements 22, 23, 25 and 27 protruding therefrom. A single cable 24, which is preferably of the Bowden wire type, operatively connects the control box 20 and a lever 26 carried by the transmission 18.

The lever 26 is keyed to a vertically extending shaft 28 which extends into the interior of the transmission and is rotatably mounted in a boss 30 carried by the casing of the transmission. A lever plate 32 is mounted on shaft 28 for rotation therewith within the casing of the transmission. The lever plate 32 is provided with a laterally extending finger 34 which is operatively connected to a movable element 36 of a drive ratio selector valve 38. The drive ratio selector valve 38 is adapted to control the hydraulic control system of a transmission in the manner described in Jeremy T. Ball patent application, Serial No. 477,870 which was filed December 27, 1954 and reference may be made thereto for a description of the hydraulic control system and the operative components of the transmission 18.

The rotatable lever plate 32 is preferably provided with a plurality of serrations 40 which are engaged by a spring detent mechanism 42 to retain the lever plate 32 in predetermined positions corresponding to different drive ratio positions of the movable element 36 of the drive ratio selector valve 38. If desired, a switch 44 carried by the casing of the transmission 18 may be provided for cooperation with a finger 46 carried by the lever plate 32. The switch 44 is wired into the electric circuit controlling the engine starter so that the engine can be started only when the transmission is in neutral.

The cable 24 includes an outer sheath 48 and an inner wire 50 which is movable longitudinally of the sheath 48. The wire 50 is secured to the lever 26 on the transmission 18 and the sheath 48 is secured at 52 to a stationary component of the vehicle such as the casing of the transmission 18. The other end of the cable 24 is connected to the control box 20 with the sheath 48 secured to a fixed extension 54 carried by the control box 20. The wire 50 of the cable 24 extends into the control box 20 for connection to mechanism therein in a manner to be described herein.

Referring to Figs. 3 through 6 of the drawings it will be seen that the control box 20, which is mounted on the instrument panel 16 has four selectively operable push buttons protruding from the front face thereof. The push buttons correspond to different settings of the transmission and have been illustrated as carrying the markings corresponding to Neutral, Reverse, Low and Drive. It is to be understood that additional push buttons could be used without departing from the invention if desired.

The mechanism within the control box 20 comprises a rotatable output or rocker member 56 which is pivotally mounted on the box 20 by means of laterally extending pin 58 which penetrates the opposite side walls of member 56 to define an axis. The wire 50 of cable 24 is connected to the rocker member 56 at 60, as more clearly shown in Fig. 4, which is located to one side of the axis defined by the pin 58 so that rotation of the rocker member 56 will impart longitudinal movement to the wire 50 which in turn will move lever 26, lever plate 32 and the control element 36 of valve 38 to effect a selected transmission drive ratio.

Each of the selectively operable push buttons 22, 23, 25 and 27 are supported in the front wall 62 and rear wall 64 of the control box 20 for movement toward and away from the rotatable rocker member 56. As seen in Fig. 5, the push button 22 carries a pair of cooperating cam elements 66 and 68 whose forwardly extending edges are adapted to strike upper and lower transversely extending portions 67 and 69 of the rocker member 56 to predetermine the angular position which the rocker member will assume when push button 22 is depressed. This position for the purpose of illustration may be called the "Neutral" position. The cam surfaces have slightly different spacing on each of the push buttons 22, 23, 25 and 27 so that no two of the push buttons dictate the same angular position of the rocker member 56 and the lengths of the cam elements on the push buttons is preselected so that the angular positions assumed by the output member 56 in response to selective operation of the individual push buttons causes adequate movement of lever plate 32 to position one of the serrations 40 in operative relation with the spring detent mechanism 42.

For example, as shown in Fig. 6, when the lever 23 is applied, the cooperating cam elements 66' and 68' engage the transversely extending portions 67 and 69 to determine the angular position of the rocker member 56 in the "Reverse" position.

A means for latching each of the push button units at a position corresponding to a predetermined position of the rocker member 56 comprises with reference to lever 22 a spring member generally designated by the numeral 70 which includes a flat vertical portion 72 riveted to the lever 22 as at 74 in Fig. 5. Integral with the vertical portion 72 are horizontally extending converging spring legs 76 and 78 which at 80 form a pocket or seat to receive the pin 58. Diverging spring legs 82 and 84 are integral with and extend from the ends of the legs 76 and 78 adjacent the pocket, respectively. Like numbers are given to the spring 70' which is secured to lever 23 with the exception that the numbers are primed. Each of the lever members 22, 23, 25 and 27 are provided with elongated slots as at 86 in the lever 22 in Fig. 5 and 86' in the lever 23 in Fig. 6 which receive the pin 58. The pin 58 not only serves as an axis for the rocker member 56 but also as anchor means for each push button lever when it is applied. The diverging spring legs 82 and 84 act as guide means to lead the pin 58 into the pocket 80. The relative position of the spring member 70 with respect to the pin 58 when the lever 22 is in its unapplied position may be seen in the broken away portion of Fig. 6. The inherent spring strength of each spring member 70 holds the push button lever in applied position. The spring member 20 maintains the lever 22 in applied position even against the force of a coil spring 90 which is disposed around a portion of the lever between the rear wall 64 and an abutment 92 on the lever. Similarly, the lever 23 is provided with a coil spring 90'. These coil springs 90 and 90' are utilized to urge each lever to its unapplied position after it has been released and during the intervals it is not being used. It will be understood that the detailed showing and description of push button levers 22 and 23 is for the purpose of illustration and that the levers 25 and 27 are provided with the same operating structure as the other two levers.

In accordance with the present invention each push button lever member, when it is applied, releases the lever previously applied. For example, in viewing Figs. 5 and 6, the lever 23 releases the lever 22 when the former is applied. This action is accomplished in the following way: when the lever 23 is moved inwardly, the cam element 66' engages the transverse portion 67 of the rocker member 56 rotating it in a counterclockwise direction as viewed in Figs. 5 and 6. This rotation of the rocker member causes the transverse portion 69 to urge the cam element 68 of the lever 22 in a rightwardly direction until the spring legs of the spring 70 become disengaged with the pin 58 and the coil spring 90 associated with the lever 22 returns the latter to its inactive position. Substantially simultaneously the spring legs 76' and 78' of the spring 70' which is secured to the lever 23 engage the pin 58 and the lever 23 is secured in its applied position. In this position the position of the rocker member 56 is determined by the relative dimensions of the cam elements 66' and 68' of the lever 23. Similar action takes place when any lever is applied.

It will be seen, therefore, that the foregoing described structure permits safe operation of the vehicle transmission assembly. In one simultaneous operation by the operator of the vehicle, one push button lever is applied while the previously applied lever is released.

While I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:

1. Control apparatus for a vehicle provided with an automatic transmission having a control member which is selectively movable to a plurality of positions to establish respectively different driving ranges of the transmission, said control apparatus comprising a device located within the reach of the operator of the vehicle and including a housing, a plurality of push button lever members slidably mounted in said housing and being movable from inactive positions to applied positions and from applied positions to inactive positions, spring means operatively connected between said lever members and said housing and yieldably urging said lever members outwardly of said housing, rocker means pivotally carried by said housing including first and second transverse members spaced on opposite sides of the pivotal axis of said rocker means and extending perpendicular to the direction of movement of said lever members, means operably connecting said rocker means and said transmission control member to facilitate the selection of one of the driving ranges of said transmission, pin means carried by said housing substantially parallel to said transverse members, each of said lever members having spaced cam elements adapted to engage said transverse members when moved to its applied position to rotate said rocker means to different predetermined positions, and a plurality of spring members each being secured to one of said lever members and each comprising converging spring legs cooperating to form a seat to receive said pin means when each lever member is moved to its applied position.

2. The subject matter of claim 1 wherein the converging spring legs of said spring members are provided with integral diverging tips adapted to guide said pin means into said seat.

3. The subject matter of claim 1 wherein one cam element of each of said lever members when the latter is moved to an applied position engages one of said transverse members to rotate said rocker means to thereby cause the other of said transverse members to urge a previously applied lever member to its inactive position.

4. Control apparatus for a vehicle provided with an automatic transmission having a control member which is selectively movable to a plurality of positions to establish respectively different driving ranges of the transmission, said control apparatus comprising a device located within the reach of the operator of the vehicle and including a housing, a plurality of push button lever members slidably mounted in said housing and each having an elongated slot therein, said lever members being slidable from inactive to applied positions and from applied positions to inactive positions, spring means operatively connected between said lever members and said housing and yieldably urging said lever members outwardly of said housing, rocker means pivotally carried by said housing including first and second transverse members spaced on opposite sides of the pivotal axis of said rocker means and extending perpendicular to the direction of movement of said lever members, means operably connecting said rocker means and said transmission control member to facilitate the selection of one of the driving ranges of said transmission, a pin carried by said housing substantially parallel to said transverse members, said pin forming said pivotal axis and extending through the elongated slots in each of said lever members, each of said lever members having a cam element adapted to engage said transverse members to rotate said rocker means to different predetermined positions, and a plurality of spring members each being secured to one of said lever members and each comprising converging spring legs cooperating to form a seat to receive said pin when each lever member is moved to an applied position.

5. The subject matter of claim 4 wherein the converging spring legs of said spring members are provided with integral diverging tips adapted to guide said pin means into said seat.

6. The subject matter of claim 4 wherein one cam element of each of said lever members when the latter is moved to an applied position engages one of said transverse members to rotate said rocker means to thereby cause the other of said transverse members to urge a previously applied lever member to its inactive position.

7. Control apparatus for a vehicle transmission including a housing, a plurality of push button lever members slidably mounted in said housing and movable from inactive positions to applied positions and from applied positions to inactive positions, means yieldably urging said lever members outwardly of said housing, rocker means pivotally carried by said housing including first and second transverse members spaced on opposite sides of the pivotal axis of said rocker means, means operably connecting said rocker means and said transmission, retainer means carried by said housing, each of said lever members having an abutment adapted to engage said transverse members to rotate said rocker means to different predetermined positions, and spring means secured to each of said lever members, said spring means having first and second portions cooperatively clampingly engageable with said retainer means for holding each lever member in its applied position.

8. Control apparatus for a transmission including a housing, a plurality of push button lever members slidably mounted in said housing and movable from inactive positions to applied positions and from applied positions to inactive positions, means yieldably urging said lever members outwardly of said housing, rocker means pivotally carried by said housing including first and second transverse members spaced on opposite sides of the pivotal axis of said rocker means, means operably connecting said rocker means and said transmission, pin means carried by said housing, each of said lever members having a cam element adapted to engage said transverse members to rotate said rocker means to different predetermined positions, and a plurality of spring members each being secured to one of said lever members and each comprising converging spring legs cooperating to form a seat to receive said pin when each lever member is moved to its applied position.

9. The subject matter of claim 8 wherein the converging spring legs of spring members are provided at their seat end with integral diverging tips adapted to guide said pin means into said seat.

10. Apparatus for effecting movement of a controllable member including a housing, a plurality of push button lever members slidably mounted in said housing and movable from inactive positions to applied positions and from applied positions to inactive positions, means yieldably urging said lever members outwardly of said housing, rocker means pivotally carried by said housing including first and second transverse members spaced on opposite sides of the pivotal axis of said rocker means, means operably connected to said rocker means and adapted to be connected to said controllable member, pin means carried by said housing, each of said lever members having a cam element adapted to engage said transverse members to rotate said rocker means to different predetermined positions, and a plurality of spring members each being secured to one of said lever members and each comprising converging spring legs cooperating to form a seat to receive said pin when each lever member is moved to its applied position.

11. The subject matter of claim 10, wherein the converging spring legs of spring members are provided at their seat end with integral diverging tips adapted to guide said pin means into said seat.

12. Apparatus for effecting movement of a controllable member including a housing, a plurality of push button lever members slidably mounted in said housing and each having an elongated slot therein, said lever members being slidable from inactive to applied positions and from applied positions to inactive positions, spring means operatively connected between said lever members and said housing and yieldably urging said lever members outwardly of said housing, rocker means pivotally carried by said housing including first and second transverse members spaced on opposite sides of the pivotal axis of said rocker means and extending perpendicular to the direction of movement of said lever members, means operably connected to said rocker means and adapted to be connected to said controllable member, a pin carried by said housing substantially parallel to said transverse members, said pin forming said pivotal axis and extending through the elongated slots in each of said lever members, each of said lever members having a cam element adapted to engage said transverse members to rotate said rocker means to different predetermined positions, and a plurality of spring members each being secured to one of said lever members and each comprising converging spring legs cooperating to form a seat to receive said pin when each lever member is moved to an applied position.

13. The subject matter of claim 12, wherein the converging spring legs of said spring members are provided with integral diverging tips adapted to guide said pin means into said seat.

14. The subject matter of claim 12, wherein one cam element of each of said lever members when the latter is moved to an applied position engages one of said transverse members to rotate said rocker means to thereby cause the other of said transverse members to urge a previously applied lever member to its inactive position.

15. Apparatus for effecting movement of a controllable member including a housing, a plurality of push button lever members slidably mounted in said housing and movable from inactive positions to applied positions and from applied positions to inactive positions, means yieldably urging said lever members outwardly of said housing, rocker means pivotally carried by said housing including first and second transverse members spaced on opposite sides of the pivotal axis of said rocker means, means operably connecting said rocker means and said transmission, retainer means carried by said housing, each of said lever members having an abutment adapted to engage said transverse members to rotate said rocker means to different predetermined positions, and spring means secured to each of said lever members, said spring means having first and second portions cooperatively clampingly engageable with said retainer means for holding each lever member in its applied position.

References Cited in the file of this patent

UNITED STATES PATENTS

| | | |
|---|---|---|
| 1,809,778 | Evans | June 9, 1931 |
| 2,335,812 | Steffens | Nov. 30, 1943 |
| 2,365,088 | Lane | Dec. 12, 1944 |